United States Patent [19]

Greiner et al.

[11] 4,271,441

[45] Jun. 2, 1981

[54] INTEGRAL SHIELD AND BIAS ELEMENT FOR MAGNETIC TAPE CASSETTES

[75] Inventors: Joachim Greiner, Ebenhausen; Albrecht Mager, Rodenbach, both of Fed. Rep. of Germany

[73] Assignee: Vacuumschmelze GmbH, Hanau, Fed. Rep. of Germany

[21] Appl. No.: 60,995

[22] Filed: Jul. 26, 1979

[30] Foreign Application Priority Data

Aug. 12, 1978 [DE] Fed. Rep. of Germany ....... 2835459

[51] Int. Cl.³ ............................................. G11B 15/60
[52] U.S. Cl. ............................................. 360/130.33
[58] Field of Search ........................... 360/130.33, 132

[56] References Cited

U.S. PATENT DOCUMENTS

4,011,593  3/1977  Gaiser et al. ...................... 360/132

FOREIGN PATENT DOCUMENTS

2036754 10/1974 Fed. Rep. of Germany .
2212062  7/1975 Fed. Rep. of Germany .
2225020  3/1977 Fed. Rep. of Germany .
2633672  2/1978 Fed. Rep. of Germany .

OTHER PUBLICATIONS

Masumoto et al., "Recent ... Metals", Science Reports, Tohoku U., A-vol. 25, No. 6, Nov. 1975.
Fujimori et al., "New ... Materials", Science Reports, Tohoku U., A-vol. 26, No. 1, Jun. 1976.

*Primary Examiner*—Robert S. Tupper
*Attorney, Agent, or Firm*—Hill, Van Santen, Steadman, Chiara & Simpson

[57] ABSTRACT

A flexible and resilient, magnetic shielding element fabricated out of a soft magnetic alloy is provided. This shielding element not only provides magnetic shielding, but also may be used to provide a biasing force. Thus, for example, when a magnetic head is inserted into a tape cassette, a shielding element, as provided by this invention and positioned adjacent to the magnetic head opening of the cassette and on the other side of the magnetic tape from the tape head, both shields the tape head and biases the tape against the head to afford intimate contact with the tape head. Alloys which manifest a static coercive field intensity of less than 200 mA/cm, a relative static permeability, (measured as the continuous or d.c. field permeability at 4 mA/cm), of at least 2000, a Vickers hardness of at least 180, and an elastic limit of at least 500 N/mm² are appropriate. Crystalline as well as amorphous, soft magnetic alloys are suitable.

11 Claims, 3 Drawing Figures

INTEGRAL SHIELD AND BIAS ELEMENT FOR MAGNETIC TAPE CASSETTES

BACKGROUND OF THE INVENTION

1. Field of the Invention

The present invention relates to a springy shield element, and more particularly, to a flexible shielding element for biasing magnetic tape in a cassette against the tape head while also magnetically shielding the head.

2. Description of the Prior Art

Generally, magnetic heads are protected from magnetic noise fields by protective shields. Customarily, the magnetic heads, with the exception of the tape head against which the magnetic tape rests, are surrounded by a shield. Shielded magnetic heads of this type, either a combined recording and playback head or separate magnetic heads (in the case of commercial compact cassettes for sound recordings, in which the tape is rewound between two wound cores), pass through openings in the frontal face of the cassette when in the operating position. At these locations, shielding elements are disposed within the cassette, commonly in the form of a flat or U-shaped sheet metal consisting of a highly permeable iron-nickel alloy, and are intended to cover the tape head. In order to press the magnetic tape against the magnetic head, additional spring elements are provided at these same locations. In the cassette according to the German utility model No. 72 08 034, a rigid or fixed shield member, which is arranged opposite the magnetic head on the other side of the magnetic tape and which bears a glide support for the magnetic tape is pressed, on its side not facing the magnetic tape, against the magnetic head by means of a spring element. In the case of other commercial cassettes, the contact pressure spring which bears a glide support consisting of felt, or a foam-like material, is disposed between the sound recording tape and the shield element. In addition, from the German AS No. 20 36 754, a shield element is known which is designed in the form of a hollow cuboid which is open on one side and whose four lateral faces overlap the tape head, including the shield surrounding the tape head when in the operating mode. Through this form of shield the influence of the shield material is reduced, so that instead of the highly permeable alloys, particularly the costly iron-nickel alloys, less costly materials of a relatively low permeability, such as soft-magnetic types of iron, can be utilized. In this type of shielding, a separate contact pressure spring for the second recording tape is also necessary.

The combining of the shielding and contact-pressure spring function in a single component is known from the German OS No. 26 33 672. The component there consists of a strip-shaped, two-layer laminate, whereby the one layer consists of a springy material, for example beryllium bronze, and the other layer consists of a stress-free material of high magnetic permeability, for example iron, nickel, or an iron-nickel alloy. Furthermore, there is disposed on the laminate a flexible or elastic contact pressure piece which keeps the springy shield element at a distance of approximately 0.8 to 1 mm from the sound head. By combining the shielding and contact-pressure function in one component, the assembly is considerably simplified and the space requirement for the spring and shield in the cassette is reduced while obtaining the same or even an improved shielding effect. However, the manufacture of the two-layer laminate is comparatively costly.

SUMMARY OF THE INVENTION

It is an object of the invention to further simplify shield elements, particularly those for magnetic tape cassettes, while maintaining the combination of the shielding and contact-pressure function in one component.

This object is achieved in accordance with the invention by virtue of the fact that the shield element consists of a springy, soft magnetic alloy. Suprisingly, it has been found that given a suitable alloy selection, the soft magnetic alloy itself can assume the spring function without the shield function suffering as a consequence.

The springy shield element in accordance with the invention can advantageously be provided in a strip-shaped construction.

Alloys manifesting a static coercive field intensity of less than 200 mA/cm, a relative static permeability, $\mu_4$ (measured as the d.c. field permeability at 4 mA/cm) of at least 2000, and a diamond pyramid hardness (Vickers hardness) of at least 180 are particularly favorable. Preferably, the elastic or yield point of the alloy should be at least 500 N/mm$^2$. These demands can be met with crystalline, soft magnetic alloys as well as with amorphous soft magnetic alloys. As is known, the latter can be manufactured by cooling off a corresponding melt so rapidly that a solidification without crystallization occurs. With their formation, these alloys can be obtained in the form of thin tapes whose thickness can amount to several hundredths of a millimeter and whose width can amount to from several millimeters up to several centimeters.

Of the crystalline soft magnetic alloys, the alloys which are especially suitable for the springy shield element are those which consist of 35 to 87% by weight nickel, 0 to 10% by weight niobium, 0 to 5% by weight titanium, 0 to 12% by weight copper, 0 to 6% by weight molybdenum, 0 to 4% by weight chromium, and iron for the remaining portion (exclusive of deoxidizing additives and the customary impurities caused by manufacturing), with the restrictions that the total concentration of niobium and titanium will lie between 1.5 and 10% by weight, and the total concentration of copper, molybdenum, and chromium, will lie between 0 and 13% by weight, and that, given a titanium concentration of 0% by weight, the niobium concentration will amount to at least 5% by weight. Alloys of this type are already known for the purpose of utilization for magnetic heads from the German AS No. 22 12 062 and the German OS No. 22 25 020; however, nothing can be learned from these references regarding the suitability of the above-cited alloys as springy shields.

As is already known of the so-called permalloy-alloys, the elements copper, molybdenum, and chromium improve the magnetic properties of the alloys, whereas niobium and titanium represent hardening additives. Given a total concentration of less than 1.5% by weight niobium and titanium, the alloys would not be sufficiently hard, whereas excessively high concentrations of these components would have an unfavorable effect on the magnetic properties of the alloys, noticeable particularly in a decrease in the saturation induction.

Alloys whose nickel concentration lies between 68 and 81% by weight and whose total concentration of copper, molybdenum, and chromium lies between 1.5 and 13% by weight are particularly favorable with regard to the magnetic properties. In order to obtain good spring properties, the alloy's total concentration of niobium and titanium should favorably lie between 2 and 9% by weight. Alternatively, in the absence of niobium, the titanium concentration should lie between 2 and 3% by weight, contrarily, in the absence of titanium, the niobium concentration should lie between 7 and 9% by weight.

Alloys which have been proven to be particularly advantageous regarding their overall properties are those which consist of 72 to 77% by weight nickel, 4 to 11% by weight copper, 0 to 4% by weight molybdenum, 1 to 3.5% by weight niobium, 1.5 to 2.5% by weight titanium, and, which consists of iron for the remaining portion (exclusive of deoxidizing additives and manufacturing—induced impurities of a total maximum of 1% by weight).

Particularly low values for the coercive field intensity and high values for the permeability $\mu_4$, combined with a high Vickers hardness and spring force can be achieved in the case of the previously cited alloys, if the latter are first annealed in the finish-rolled state for the purpose of recrystallization. This process might last seconds to several days, but is preferably 2 to 4 hours long at a temperature of between approximately 700° and 1000° C. and in the presence of an inert gas, for example hydrogen. The alloys are then subjected to an approximately 1 to 4 hour tempering treatment in the temperature range of between 500° and 700° C. for the purpose of curing or age hardening. In the case of these cited alloys, the thickness of the resultant strip-shaped shield element preferably amounts to 0.07 up to 0.25 mm.

As previously mentioned, amorphous soft-magnetic alloys are further suitable for the inventive springy shield element. Generally, an amorphous metal alloy is understood to be an alloy which is amorphous up to at least 50% and preferably to at least 80%. Depending upon the manufacturing conditions, the amorphous alloys can be completely amorphous or can comprise a two-phase mixture of the amorphous and the crystalline state. For every amorphous metal alloy there is a characteristic temperature, the so-called crystallization temperature. If the amorphous alloy is heated to or above this temperature, it passes into the crystalline state in which it remains after cooling. By way of contrast, in the case of heat treatments below the crystallization temperature, the amorphous state is maintained.

The hitherto known soft-magnetic amorphous metal alloys have the composition $M_y X_{100-y}$, whereby M denotes at least one of the metals: iron, cobalt, and nickel; X denotes at least one of the so-called glass-forming elements: boron, carbon, silicon, and phosphorus; and y lies between approximately 70 and 90. The subscripts thus indicate the respective alloy's concentration of the corresponding elements in gram-atomic percentage. In addition to the metals M, the amorphous alloys can also contain additional elements; in particular titanium, zirconium, hafnium, vanadium, niobium, tantalum, chromium, molybdenum, tungsten, manganese, palladium, platinum, copper, silver, or gold. In addition to the glass-forming elements X, or possibly instead of the latter, the elements aluminum, gallium, indium, germanium, tin, arsenic, antimony, bismuth, or beryllium, can be present.

An amorphous alloy of the composition $Ni_a Fe_b X_c$, with $35 \leq a \leq 45$, $35 \leq b \leq 45$, $c = 20$, and $a + b + c = 100$, is particularly suited for the inventive springy shield element. Furthermore, amorphous alloys of the composition $Fe_{80} X_{20}$ and $Co_d Fe_e X_f$ with $70 \leq d \leq 78$, $2 \leq e \leq 10$, $20 \leq f \leq 25$, and $d + e + f = 100$ have proven to be suitable. Alloys of this type are known e.g., from "Science Report of the Research Institutes, Tohoku University, Sendai/Japan", A-Volume 25, No. 6, page 232 ff. and A-Volume 26, No. 1, page 36 ff.

The cited amorphous alloys show sufficient magnetic properties and very good mechanical properties even after their manufacture by rapid cooling-off of the melt. Through heat treatments between the Curie temperature and the crystallization temperature, the magnetic properties can yet be further improved, the coercive field intensity can be decreased and the permeability increased.

It is particularly favorable if the springy shield element is bent or curved while in the tension relaxed state. Through a corresponding dimensioning of this curvature, the tension requirements for pressing the magnetic tape against the tape head during operation with the prescribed conventional force may be accomplished. In the case of the crystalline soft-magnetic alloys, a curvature can be readily achieved where the cited annealing treatment is executed while the alloy element is curved by, for example, winding up a tape consisting of this alloy onto a ring. In the case of amorphous alloys, a curvature can be achieved by manufacturing it in the curved state.

Various other objects, advantages, and features of the present invention will become readily apparent from the ensuing detailed description, examples, and drawings, with the novel features particularly pointed out in the appended claims.

DESCRIPTION OF THE PREFERRED EMBODIMENTS

Figure 2:
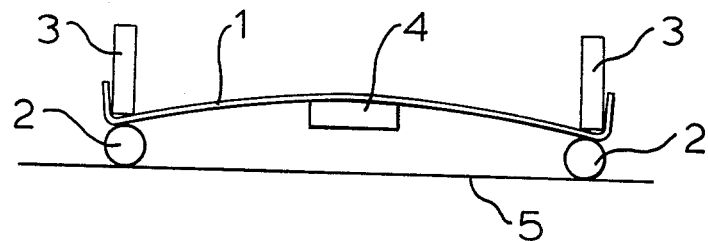
FIG. 2 schematically illustrates, as seen from above, an embodiment according to FIG. 1 as it is mounted in a tension-relaxed state in a cassette.
Figure 3:
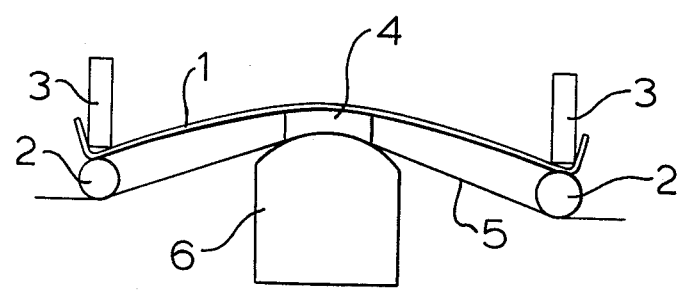
FIG. 3 is a view similar to FIG. 2 and illustrates the same shield element during pressing of the magnetic tape against a sound recording head.

The effect of the pre-bending or curving the springy shield element is schematically illustrated in FIGS. 2 and 3. In FIG. 2, the springy shield element 1 is in the bent or curved, tension-relaxed state. It is held in the cassette in slots between the pins 2 and the wall pieces 3, with a felt emplacement or support 4 and the sound recording tape 5 also shown. FIG. 3 illustrates the same arrangement in the operating state. Here, the springy shield element 1 is tensed or bent and, with the aid of the contact pressure felt 4, presses the sound recording tape 5 against the tape head of the magnetic head 6.

The following example is intended to illustrate in greater detail the properties of springy shield elements consisting of a crystalline soft-magnetic alloy.

First, a 24.2 mm-wide and 0.07 mm-thick tape consisting of an alloy with approximately 76.5% by weight nickel, 4.5% by weight copper, 3% by weight molybdenum, 3% by weight niobium, 2% by weight titanium, and with the remainder consisting of iron (as well as de-oxidizing additives and manufacturing—induced impurities of a total maximum of 1% by weight) was manufactured. The subsequent deformation proceeded by means of cold rolling. Two pieces of this band, referred to as tape 1 and tape 2—both of which are 10 meters in length, were wound onto separate rings, each having a 10 cm diameter.

The ring of tape 1 was first annealed for 2 hours at 850° C., allowed to cool in the furnace to 600° C., kept for 2 hours at a temperature of 600° C. for the purpose of curing or age hardening, and finally drawn into a cooling zone of the furnace and allowed to cool there. The ring of tape 2 was first annealed for 4 hours at 900° C., then cooled off to 600° C. in the furnace, kept at this temperature for 2 hours for the purpose of curing, and likewise allowed to cool in a cooling zone of the furnace. In the case of both rings, all heat treatments and cooling steps proceeded in the presence of hydrogen.

At both rings, the static coercive field intensity $H_c$, the relative static permeability $\mu_4$, and a series of mechanical properties were measured with the following result:

|  | Tape 1 | Tape 2 |
|---|---|---|
| $H_c$ mA/cm$^2$ | 23 | 12 |
| $\mu_4$ | 28 000 | 54 000 |
| Vickers hardness HV | 285 | 220 |
| Strength (stability) N/mm$^2$ | 900 | 720 |
| Elastic Limit or yield point N/mm$^2$ | 560 | 540 |
| Expansion % | 10 | 10 |

As is apparent, $H_c$ and the mechanical values decrease with an increasing annealing temperature, whereas $\mu_4$ increases. This means that as the magnetic values become more favorable, the mechanical values less favorable.

Figure 1:
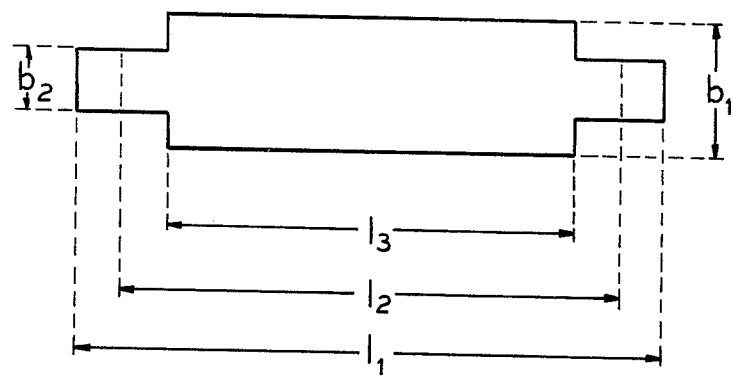
FIG. 1 illustrates a sample embodiment of the present invention for use in a sound recording tape cassette in accordance with the application.

From both tapes, strip-shaped elements were manufactured such as FIG. 1 shows in a frontal view. The dimensions were:

$l_1$=24.5 mm
$l_2$=21 mm
$l_3$=17 mm
$b_1$=5.5 mm
$b_2$=2.5 mm

In order to manufacture such an element, the tape material was clamped between the two jaws of each of two gauges, struck off with a chisel, and then bent by means of the gauge in such a fashion that buckling locations resulted at the end points of $l_2$, serving the purpose of later mounting. The longitudinal direction of the strip-shaped elements corresponded to the longitudinal direction of the tape so that, as a consequence of the annealing of the tape which was wound onto a ring, a pre-curvature was provided. There was no observable negative effect on the curvature due to the clamping, cutting, and bending. For a continuous production, the shield elements can naturally be stamped or punched out of the tape material.

The spring force and the shield effect was then measured on the elements thus manufactured.

The shield effect was checked by means of a Hemholtz coil arrangement in the center of which was a 50 Hz-alternating field with an amplitude of 0.2 A/cm. Inside the Helmholtz coil, there is an apparatus which permits the pressing of a compact against a combined recording/playback head in such a manner as in a cassette recorder. This apparatus is mounted on a rotary plate such that the head, during rotation, always remains in the center of the Helmholtz coil. The voltage induced in the head is fed to an amplifier. The head is rotated in the field in such a manner that the induced voltage manifests a maximum.

The measurement proceeded with two magnetic head types A and B, whereby, in type A the head shield projects beyond the tape head by approximately 1 mm, and in type B, it extends only to the tape head. For comparative purposes, the shield effect of a conventional flat shield section consisting of silicon-iron-sheet metal, a shield bow consisting of a highly permeable permalloy, and a shield in the form of a hollow cuboid were measured.

For measuring the spring force, the elements according to FIG. 1 were provided with a conventional contact pressure felt and inserted into a compact cassette which was then introduced into a support-mounting. Subsequently, by means of a meter the spring element was impressed to the prescribed depth, the attainment of which was indicated by a light signal. As soon as the latter lit up, the spring force on the meter was read off. For comparison, the spring force of a spring element of beryllium bronze was also measured. The results were as follows:

|  | Induced Voltage (amplified) mV | | Spring Force mN |
|---|---|---|---|
|  | Sound Head A | Sound Head B |  |
| without shield | 95.0 | 165.0 | — |
| Si—Fe—Sheet metal | 40.0 | 66.0 | — |
| Permalloy-alloy | 21.5 | 38.0 | — |
| Hollow Cuboid | 17.0 | 27.0 | — |
| Tape 1 | 20.4 | 36.4 | 346.2 |
| Tape 2 | 19.0 | 35.4 | 362.8 |
| Bronze spring | — | — | 314 to 353. |

The values indicated for Tape 1 and Tape 2 are mean values taken from 10 test samples.

As is apparent from the table, the shield effect of the springy shield elements in accordance with the application lies between that of the permalloy-alloy and the hollow cuboid. Although, due to the deformation at the edges during the manufacture of the shield elements from finally annealed tape material, the magnetic values are somewhat reduced as compared with those measured on the tape, an outstanding shield effect was obtained.

Satisfactory shield and spring effects could also be achieved with shield elements consisting of crystalline soft magnetic alloys of a different composition, for example, a springy shield element consisting of an alloy with approximately 73% by weight nickel, 10% by weight copper, 1.5% by weight niobium, 2% by weight titanium, and the remainder iron (as well as deoxidizing additives and manufacturing—induced impurities of a total maximum of 1% by weight). As the initial materials for a shield element, in the case of a 10 mm-wide and 0.1 mm-thick tape consisting of this alloy, which had been heat-treated corresponding to tape 2, the resultant properties were:

$H_c$15 mA/cm
$\mu_4$=7000
Vickers hardness=215 HV

The following example is intended to clarify the shielding properties of a springy shield consisting of a soft-magnetic amorphous alloy. A 7.9 mm-wide and 0.04 mm-thick tape consisting of an amorphous alloy of the composition $Fe_{40}Ni_{40}B_{20}$ was selected. This tape had very favorable properties already in the manufacturing state, i.e., without heat treatment. The static coercive field intensity amounted to approximately 40 mA/cm; the static permeability $\mu_4$, somewhat over 2000; the Vickers hardness amounted to approximately 1000 HV; the strength and the elastic limit or yield point lay at approximately 2000 N/mm²; and the expansion, at approximately 2%.

The shielding effect of a 21 mm-long piece of this tape was determined with the aid of the sound head B in the same manner as previously explained. Whereas the induced voltage without shielding amounted to 180 mV, and 24.6 mV when utilizing a hollow cuboid, only approximately 23 mV were induced in utilizing the amorphous tape with a distance between the tape head and the shield element of approximately 1 mm. Thus, this amorphous alloy also demonstrates an excellent shielding effect with simultaneously good mechanical spring properties.

The springy shields in accordance with the application are particularly suitable, on account of their minimal space requirement, for compact cassettes. However, they are also suitable for all other magnetic tape cassettes, and they can also be utilized for other purposes in which, simultaneously with the shield effect, a spring effect is also required. Examples of this are magnetic contact springs for soft magnetic sealing installations of magnetic shields.

While we have disclosed an exemplary structure to illustrate the principles the invention, it should be understood that we wish to embody within the scope of the patent warranted hereon all such modifications as reasonably and properly come within the scope of our contribution to the art.

We claim as our invention:

1. In a magnetic tape cassette of the type having upper and lower cassette housing parts with side walls, the front wall provided with an entry aperture for a magnetic head associated with a recording/playback apparatus and, facing this aperture, a magnetic screening shield and a tape biasing means comprising:
    a single magnetic element of uniformly resilient, "soft" magnetic alloy with an elastic limit of at least 500 N/mm²,
whereby the uniform alloy element is both a magnetic shield and a tape biasing means.

2. An improved shielding element for employment in a magnetic tape cassette as claimed in claim 1, wherein said element comprises a resilient strip of "soft" magnetic material.

3. A shielding element as described in claim 2, wherein said strip has a thickness of between 0.07 to 0.25 mm.

4. A shielding element as described in claim 1, wherein said soft magnetic alloy manifests a static coercive field intensity of less than 200 mA/cm, a relative static permeability, $\mu_4$, of at least 2000, and a Vickers hardness of at least 180.

5. An improved shielding element as described in claim 1, wherein said "soft" magnetic alloy consists of 72 to 77% by weight nickel, 1 to 3.5% by weight niobium, 1.5 to 2.5% by weight titanium, 4 to 11% by weight copper, 0 to 4% by weight molybdenum, minor amounts of deoxidizing additives and manufacturing—induced impurities of a total maximum of 1% by weight, and iron; provided that the total amount of copper and molybdenum lies between 4 and 13% by weight.

6. A shielding element as described in claim 1, wherein said soft magnetic alloy consists of 35 to 87% by weight nickel, 0 to 10% by weight niobium, 0 to 5% by weight titanium, 0 to 12% by weight copper, 0 to 6% by weight molybdenum, 0 to 4% by weight chromium, minor amounts of deoxidizing additives and manufacturing—induced impurities, and iron; provided that the total amount of niobium and titanium lie between 1.5 and 10% by weight and the total amount of copper, molybdenum, and chromium lie between 0 and 13% by weight; provided further that where the amount of titanium is 0% by weight, the niobium amount is at least 5% by weight.

7. An improved shielding element as described in claim 1, wherein said "soft" magnetic alloy consists of 68 to 81% by weight nickel, 0 to 10% by weight niobium, 0 to 5% by weight titanium, 0 to 12% by weight copper, 0 to 6% by weight molybdenum, 0 to 4% by weight chromium, minor amounts of deoxidizing additives and manufacturing—induced impurities, and iron; provided that the total amount of niobium and titanium lies between 1.5 and 10% by weight and the total amount of copper, molybdenum, and chromium lies between 1.5 and 13% by weight; provided further that where the amount of titanium is 0% by weight, the amount of niobium is at least 5% by weight.

8. An improved shielding element as described in claim 7 wherein the total amount of niobium and titanium lies between 2 and 9% by weight; provided that where the amount of niobium is 0% by weight, the amount of titanium lies between 2 and 3% by weight, and that where the amount of titanium is 0% by weight, the amount of niobium lies between 7 and 9% by weight.

9. An improved shielding element for employment in a magnetic tape cassette as described in claim 1, wherein said element exhibits curvature while in a relaxed state.

10. A shielding element as described in claim 1, wherein said soft magnetic alloy is amorphous.

11. A shielding element as described in claim 10, wherein said amorphous alloy has the composition $Ni_a Fe_b X_c$, with $35 \leq a \leq 45$, $35 \leq b 23 \, 45$, $c = 20$, $a+b+c = 100$, and where X is selected from the group consisting of: phosphorous, boron, carbon, and silicon.

* * * * *